United States Patent [19]
Moore

[11] 3,735,947
[45] May 29, 1973

[54] CUSHIONED, BARREL-CURVED, WRECK-RESISTANT VEHICLE

[76] Inventor: Alvin Edward Moore, 916 Beach Boulevard, Waveland, Miss. 39576

[22] Filed: Dec. 29, 1970

[21] Appl. No.: 102,321

[52] U.S. Cl. ...................... 244/119, 244/30, 244/96, 244/100, 244/125, 244/128
[51] Int. Cl. ............................................. B64c 1/06
[58] Field of Search .......................... 244/119, 5, 117, 244/120, 125, 128, 105, 106, 107, 101, 17.19, 17.21, 96, 92, 30, 100 A

[56] References Cited
UNITED STATES PATENTS

| | | | |
|---|---|---|---|
| 1,503,386 | 7/1924 | Stahl | 244/100 A |
| 1,645,237 | 10/1927 | Henderson | 244/96 |
| 3,152,777 | 10/1964 | McLean | 244/30 |
| 3,431,878 | 3/1969 | Moore | 114/66.5 H |
| 3,443,776 | 5/1969 | Moore | 244/119 X |
| 3,450,374 | 6/1969 | Moore | 244/119 X |

*Primary Examiner*—Richard E. Aegerter
*Assistant Examiner*—Bruce H. Stoner, Jr.
*Attorney*—Alvin Edward Moore

[57] ABSTRACT

A strong, light-weight, shock-absorbing vehicle having: a barrel-curved cabin, with surfaces curved inward toward the cabin's axis and hollow elements in the sidewalls; cushioning means, mostly below the cabin, comprising a long pad (FIG. 1) or a tandem pair of spaced pads (FIGS. 2 and 3) (optionally floating, landing or wheel-supporting means — preferably hydrofoils); stiffly resilient means, comprising inflated tubes and resilient plastic, connecting the pad or pads with the cabin; balloon means connected to the top of the cabin, stabilizing it against rolling and pitching; and a powered, reversible steering propeller for holding the high craft on course against strong winds. The preferred balloon is much larger than the cabin, and the preferred shock-absorbing means is shown in FIG. 3. The cushioning means of FIG. 2 or 3 comprises flattened corners at 29 of the main, elongated, plastic-sheathed, pad-supporting tubes (14, 16, 18), and as in FIG. 3 preferably comprises diagonal, inflated, bracing members (49, 50). The cabin comprises barrel-curved, stave-like members, bonded together at their sides, and clamped together with barrel-hoop-like rings or other looped means. These members may be arranged in the circular-in-cross section cabin form of FIGS. 2 and 3 or the oblong-in-cross-section form of FIG. 13.

28 Claims, 23 Drawing Figures

CUSHIONED, BARREL-CURVED, WRECK-RESISTANT VEHICLE

This invention has been made in view of the present-day great loss of life and property in vehicular crashes, and the need for a resiliently cushioned hydrofoil boat or other vehicle. It pertains to a nearly crashproof vehicle, especially designed as a water-traversing boat, flying boat or other aircraft that lands on cushioned support means; but with the addition of wheels or skis, fastened to its bottom fluidfoil (or to other cushioning means), its structure may be utilized as a wheeled vehicle or an aircraft that lands on ground or ice.

An object of the invention is to provide a flying or other boat that has: resilient lower cushioning means (optionally and preferably in the form of a hydrofoil or a tandem pair of hydrofoils and/or airfoils); upper balloon means (stabilizing the craft against pitching and rolling); and rearward steering means, which significantly and preferably is a steering propeller. Some other purposes of the invention are to provide: (1) a vehicle comprising a load-holding cabin having barrel-curved, substantially rigid walls, balloon means fixed to the top part of the cabin, vehicle shock-absorbing means, comprising a lower streamlined pad or narrow pad that is fluidfoil, and stiffly resilient means connecting it to the cabin; an aeronautical propeller for propelling the craft, and steering means comprising an aeronautical propeller at the rear part of the craft; (2) such a vehicle in which the said barrel-curved walls comprise stave-like members and strong looped means (for example, barrel-hoop-like bands) encompassing and tautly holding together the stave-like members; (3) such a structure in which the balloon means is supported on the cabin top by upright inflated tubular elements connected to side walls of the cabin, and the lower pad acts as a hydrofoil in water and comprises inflated-tube fluidfoil supports that are connected to lower ends of the balloon-supporting tubular means; (4) such a craft, in which the balloon means is of considerably larger volume than the cabin, the lower fluidfoil means is wider in a plane normal to the vehicle's fore-and-aft axis than is the balloon means, all parts of the said fluidfoil supports are spaced from the sides of the cabin, and strong, bar-like means are fixed to and between the cabin sides and fluidfoil supports.

Other objects will be apparent in the following specification and attached drawings.

In these drawings: FIG. 2 is a rear elevational view of another form of the vehicle, showing a left-hand portion as broken away to illustrate the structure of the after one of a pair of tandem fluidfoils or other shock-absorbing pad means and their resilient connections, in section along a rearward plane that is normal to the fore-and-aft axis; FIGS. 8 and 11 show alternative arrangements of the tubes at these planes; FIG. 12 is a side elevational view of a preferred form of the barrel-curved cabin structure, shown before application of the optional and preferred outer streamlined skin means and as being broken away in forward and lower portions to indicate them in section along a vertical, fore-and-aft plane containing the vehicle's fore-and-aft axis; FIG. 13, on a scale slightly reduced from that of FIG. 12, is a front elevational view of a form of the barrel-curved cabin structure that is non-circular in cross section, showing a bottom part that is broken away to indicate it in section at a plane comparable to 13—13 in FIG. 12; FIG. 13A is a diagram indicating in construction lines the method of determining the shape and size of the stave-like members that are at the four rounded corners of the cabin of FIG. 13; FIG. 14 is a detail view in section from a median, longitudinal plane thru one of the barrel-curved, stave-like construction members and cabin skin means; FIG. 15 is a similar detail, sectional view, showing a joint between two straight tubular elements in a straight section of a stave-like member — for example, the joint at 90 in FIG. 17; FIG. 16 is a detail, sectional view of a barrel-curved, stave-like member, comprising cans that are shaped to closely fit at adjacent, bonded-together ends of each pair; FIG. 17 is a side elevational view of a stave-like member of the general type shown in FIG. 5, having a straight middle part and barrel-curved ends; FIG. 18 is a view in cross section from a plane comparable to that indicated at 18—18 in FIG. 17, showing a plurality of stave-like members assembled in the type of cabin structure shown in FIG. 1 or FIG. 2 (or of one of the sides of FIG. 13; FIG. 19 is a cross sectional view of the barrel-curved structure of FIG. 18 from a plane comparable to that indicated at 19—19 in FIG. 17; FIG. 20 is a sectional detail view, similar to FIG. 15, showing in a stave-like member a row of cans of different diameters, bonded together at their end caps; and FIG. 21 is a sectional detail view, illustrating a means of fastening an end of a stave-like member to a door, window frame, hatch, or the like.

Figures 1, 3, 4, 5:
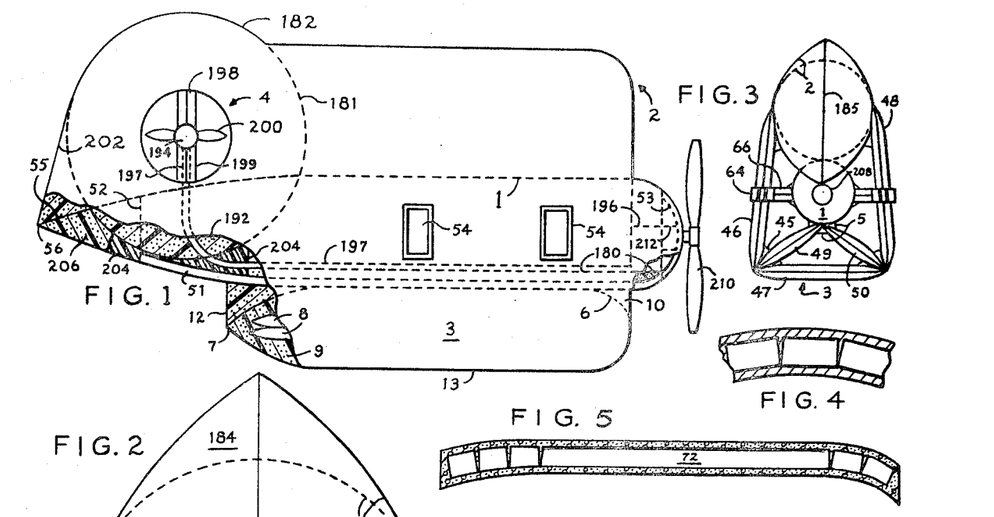
FIG. 1 is a view in side elevation of one form of the invented vehicle, shown as partly broken away at its stern to illustrate structure in section along a vertical plane containing the fore-and-aft axis of the craft.
FIG. 3 is a rear elevational view of a third form of the invention.
FIG. 4 is a detail, longitudinal, sectional view, illustrating a stave-like member of the general type that preferably is used in construction of the cabin wall of any of the above-mentioned three inventive forms.
FIGS. 5 and 6 are longitudinal, sectional views of other forms of the stave-like member.

Each of the three forms of the invention illustrated in FIGS. 1, 2 and 3 comprises: a substantially rigid, insulated cabin, 1, having the great strength per unit of weight of barrel-curved surfaces (each of the three barrel-curved cabins being optionally barrel-curved throughout its length (as in FIGS. 2, 12 and 13) or barrel-curved only at its ends (as in FIG. 1); balloon means 2 at the upper part of the vehicle, comprising one or more balloons, having a center of lift above the craft's center of gravity, aiding in stabilizing the craft against rolling and pitching; shock-absorbing pad means 3, below the cabin, preferably a float or fluidfoil, and preferably comprising a plurality of inflated, resilient tubes in a flexible skin; aerodynamic steering means at or near the stern, in some constructions and locations being optionally of known aircraft type that comprises a rudder, with or without an aeronautical elevator, but preferably the steering means of this invention comprises a steering propeller and its support, 4; and forward-propulsion means.

FLOAT, CUSHIONING HYDROFOIL, OR LANDING MEANS

Figures 12, 13, 13A, 14, 15, 18, 19, 20, 21:
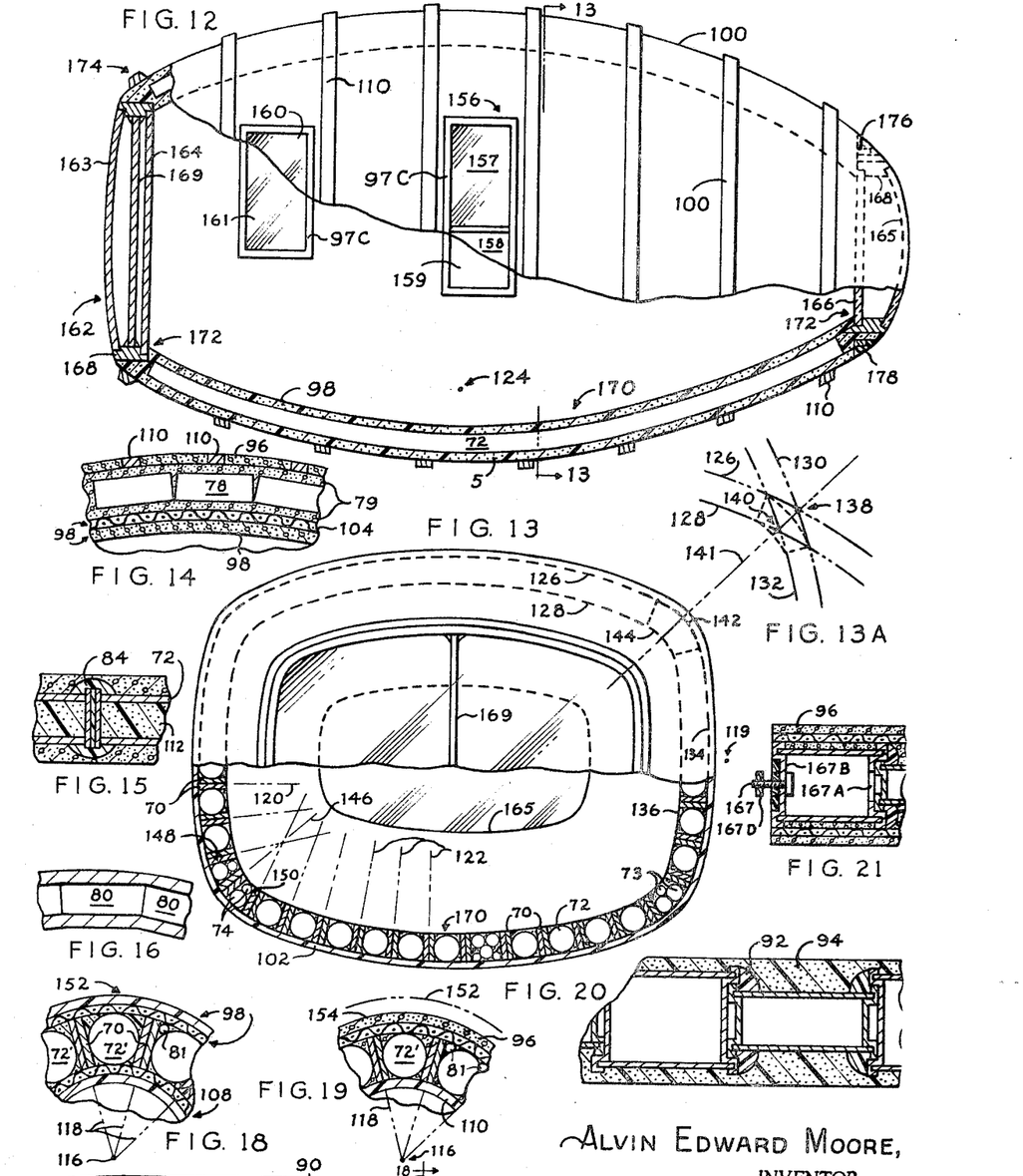

As shown in FIG. 1, the vehicle has a shock-absorbing means that comprises: an inner pad skin; within and comprising this inner skin, a pad 3 (optionally circular in cross sections or having a cross-sectional shape of the general type shown in FIG. 13), rounded at its forward end 6 and pointed at its stern 7, having sealed, flexible-material tubular elements that contain gaseous material which preferably is aerial or lighter-than-air gas under pressure well above that of the atmosphere (for example in the range of 10 to 30 pounds per square inch), and preferably are flattened at their forward and rear portions as indicated at 8, and flexible, gas-cell-containing foam plastic 9 that surrounds the tubes; and means strongly connecting the pad and cabin which comprises: strongly flexible fairing means of foam plastic (elements 10 and 12 and smooth-outline-forming foam-plastic elements at the curving upper sides of the pad) and the outer skin 13 which encompasses the pad and fairing means). Optionally the fairing elements may be made separately from the tube-containing pad; or all the elements within the skin 13 may be formed within a mold to fit the bottom curve of the cabin 1.

Figures 7, 8, 9, 10, 10A, 11:
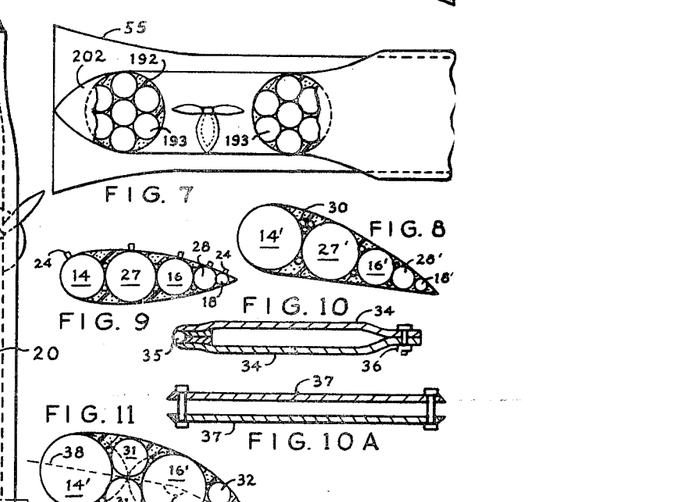
FIG. 7 is a top plan view, partly broken away illustrating a rear portion of the vehicle of FIG. 1.
FIGS. 8, 9 and 11 are detail, cross sectional views of optional arrangements of the resilient tubes of the lower fluidfoils or pads and their upright, resilient connections of FIG. 2 (FIG. 9 is a sectional view from either of the planes 8—8 and 9—9 of FIG. 2 (but showing variations in the sizes of the tubes of FIG. 2)
FIG. 10 is a detail, longitudinal, sectional view of the optional tube-clamping device shown at 29 in FIG. 2.
FIG. 10A is a sectional detail view of another form of this clamping device.

The cushioning, shock-absorbing means of FIG. 2 also has: lower pad structure 3, which comprises a skin 23' that preferably is integral with the skin 23; tubular elements within the skin means, inflated with gaseous material (preferably aerial or lighter-than-air gas under high pressure in the above-mentioned range); and, preferably, gas-cell-containing foam plastic between the tubes and skin means (not shown in FIG. 2, but shown in FIGS. 8, 9 and 11). The main tubular elements of the pad are preferably integral with similar main tubular elements of the resilient pad-supporting means which strongly connect the pad (or tandem pads) with the cabin. Each main, elongated tubular member thus comprises: a support tubular element on each side of the cabin and a pad tubular element integrally connected to the flattened bottom ends of the support. Three of these tubular elements are sectionally shown in one streamlined upright pad support in the left-hand part of FIG. 2 (at 14, 16 and 18) but preferably at least five tubular elements are utilized (as more clearly indicated in FIGS. 8 and 9 and 11) in each of the tandem pads and each of their tandem supports. (Only the rear one of these similar tandem sets is indicated in FIG. 2, the forward set not being visible in this rear elevational view). The filler material between each pair of the main tubular elements (14, 16, 18, 14', 16', 18') optionally may be of continuous foam plastic; but preferably this filler material comprises separate, sealed, inflated tubes, imbedded in foam plastic, in each pad and each of the pad supports.

Preferably there are three main, great-strength-providing tubular members (14, 16, 18). Each of these extends downward from a point at or near one side of the cabin, is clamped or bonded into a substantially flattened portion at one end of the lower, streamlined pad (float, hydrofoil or landing cushion); thence it extends thru the pad (as tubular elements or sections 14', 16', 18') to its other end, where it it also clamped or bonded into a substantially flattened portion; and thence it goes upward to a second connection with the cabin on its other side. For example, the smaller, trailing-edge one of these three long tubular members (18, shown as much smaller in FIG. 9 than in FIG. 2), has two upright pad-supporting sections and the middle, pad section (18 in FIG. 8, 18' in FIG. 9). These three sections are integrally connected. In like manner, each of the other two main, elongated tubular members has two upright sections (14, 16) and a middle, pad section (14', 16').

These three tubular members are successively of smaller diameter in a direction toward the stern, with the smallest tubular member 18 being at or near the trailing edge of the support. This trailing edge is preferably finely streamlined to the rear line 20, which is formed by glued-together rear edges of the skin (23, 23').

The tandem pair of vehicle-cushioning pads 22 are preferably boat floats or hydrofoils; but optionally they may serve as devices for landing on the ground — for example as: ground-engaging cushions for a very-large-balloon, nearly-vertical-takeoff aircraft; cushions of an airplane to which skids or skis are attached; or front and rear shock-absorbing, wheel-supporting cushions in an aircraft or land vehicle. Some of the optional shapes of the tandem pads are shown in FIGS. 8, 9 and 11. The optional pad of FIG. 9, similar to the one shown in FIG. 2, is streamlined but exerts no fluid-dynamic (hydrodynamic or aerodynamic) lift on the vehicle; whereas the alternative pads of FIGS. 8 and 11 are fluidfoils (hydrofoils and/or airfoils).

In construction of the pad of FIG. 9, the first step is smoothly laying the skin means 23, 23' on the properly curved upper surface of an elongated fixture. Then, as a second step, the three main, elongated tubes (14 — 14'; 16 — 16'; 18 — 18'), flattened and sealed at their ends, and optionally inflated with gas thru valved inlets 24 at a pressure that is temporarily only slightly above that of the atmosphere, are assembled on the skin and fixture, with a set of the filler tubes 27 and 28 (27 or 27' and 28 or 28', also preferably only mildly inflated at this stage) between each pair of the main tubes.

Each of these sets optionally and preferably comprises two relatively short filler tubes. Optionally, each of these two may be integral, in one elongated filler-tube member; but preferably in the forms of FIGS. 8 and 9 they are not integral, but stop short of the flattened ends and the flattened middle junctions of the main tubular members 14, 16 and 18. These tandem sets of filler tubes are thus preferred to the optional continuous plastic filler because they serve three useful purposes in the tubular assembly: (1) as they have strong, preferably flexible envelopes and finally contain strongly resilient gaseous material, for example air or lighter-than-air gas under pressure of well above that of the atmosphere, for example 15 to 30 pounds), and strongly contact the sidewalls of the main, elongated tubular members 14, 16 and 18 that flank them, they add a large amount of strength to the main tubes — and thus to the pads and their supports; (2) because they are straight as well as strong they tend to hold each pad and its upright pair of supports from bulging out at their middle portions toward arcuate form; and (3) they aid in making the correct streamlined form of the pad and its support while they are being formed on the fixture.

After the above-described second method step, the following six other steps in construction of the tubular assembly are: (3) wrapping the skin tautly over the tops of the inflated tubes and fastening its two edges together in a smooth joint at the top; (4) fastening and bonding together the flattened ends of the covering skin means and the main tubular members, for example with epoxy, putty or other glue; (5) thru a quickly sealable hole in the skin, inserting liquid materials of foam plastic, within the skin, around the tubes, and in the spaces between the ends of the filler tubes that will be adjacent to the corner 29 between the pad and lower ends of the pad support, and sealing the hole against escape of the forming plastic (which after setting is preferably flexible and resilient — for example, foam rubber); (6) waterproofing and smoothing over the joints between the edges of the skin at its top and ends, and preferably over the whole skin means — for example with a coating of air-setting liquid rubber; (7) with the aid of bar clamps of the type shown in FIG. 10 or 10A, flattening and permanently clamping the skin and the sidewalls of the main, elongated tubes at the corners 29 (in this step the flexible foam plastic is forced aside from the clamps, and optionally these are so tightened over the skin and tube sidewalls that the walls bar passage of gas between sections of the elongated tubes, and in this event each of the tube sections has a separate gas-inlet valve 24); and (unless the tubes are filled with gas-cell-containing foam plastic, which is not preferred) (8) strongly inflating all the filler tubes and tubular elements of the main tubular members with air, helium or other gas at a high pressure — for example, at 15 to 30 pounds per square inch.

The type of shock-absorbing, vehicle-strengthening device (system of tubes, skin means and foam plastic) which comprises a lower fluidfoil of the form shown in FIG. 8 or FIG. 11 is also made in accordance with the above-described general method. In this instance, the upright (inclined) pad-supporting side portions of the device preferably are streamlined in the same manner as in FIG. 2; but the lower pads are different in that in cross section they are inclined to the horizontal, having an angle of attack relative to fluid traversed by the vehicle, and therefore exerting a lift on it. In FIG. 8 the filler tubes 27' and 28' are similar to the tubes 27 and 28, ending near but clear of the flattened portions of the device at its corners and upper ends. As in FIGS. 8, 9 and 11, small auxiliary filler tubes 30 (pieces of bamboo or plastic or metal tubes) optionally may be utilized; or, optionally, such small tubes or continuous foam plastic may take the place of the larger filler tubes.

To provide for the desired angle of attack of the fluidfoil (hydrofoil and/or airfoil) of FIG. 8 the lengths of the tubular elements are changed from those illustrated in FIG. 2, and the clamps at the corners are set at angles to a horizontal plane parallel to the cabin's axis, with their trailing-edge portions below their forward ends. Although the streamlined arrangement of the upright tubular-member sections 14, 16 and 18 remains the same, the flattened bottom ends of the upright tubular elements 16 are now lower than those of the upright elements 14, and the flattened bottom ends of the upright tubular elements 18 are lower than those of upright elements 16. Also, as illustrated in FIG. 8: the center line of the horizontal tubular-member element 16' of the pad is lower than the center line of the tubular element 14'; the center line of horizontal tubular element 18' is lower than that of 16'; and the center lines of the optional filler tubes 27' and 28' preferably are substantially in a plane that contains the center lines of 14', 16' and 18'. (Optionally, these five lines instead may be on a curve, providing for a cambered lower surface of the fluidfoil, but currently this construction is not preferred.) The lengths also of the tubular elements 14', 16' and 18' are now different, with the element 16' being longer than 14' and 18' being longer than 16'. In consequence of these arrangements the clamps at 29 are now inclined to a level plane, and each fluidfoil of the tandem pads presents a lifting angle of attack to the fluid traversed by the vehicle.

FIG. 11 shows a different arrangement of fluidfoil tubes. Here the filler tubes 27' and 28' of the form of FIG. 8 are replaced, respectively, by inflated tubular elements 31 and 32. These elements may be tubes that end short of the flattened portions of the main tubular members; or optionally they may be main, elongated tubular members that, like 14—14', 16—16' and 18—18', have angles at 29 and flattened, sealed upper ends that are connected, thru their skin means, to the sides of the cabin. When they are thus elongated their portions at 29 are of course substantially flattened by the clamps, but because of their staggered arrangement and the preferred shape of the clamps used with the inventive form of FIG. 11 these portions are not in the way of the adjacent flattened portions of 14—14', 16—16' and 18—18'.

The clamps used with the forms of FIGS. 8 and 9 have mostly straight clamping bars and may be of the construction illustrated in either FIG. 10 or 10A. In FIG. 10 the two identical clamping arms 34 are straight except at their ends, where they are slightly curved. At one of these ends the hinge 35 is fastened; and when the bars are positioned about the tubes and skin at 29 the nut 36 is tightened until the stainless steel or bronze bars tautly grip the flattened portions of the tubular sidewalls together. In the currently preferred form shown in FIG. 10A two entirely straight bars 37 are utilized, with a clamping bolt and nut at each end of the assembled bars. Such straight bars optionally may be used with the fluidfoil of FIG. 11; but here preferably each of the two parallel bars comprises two integral straight sections that have inner surfaces that are parallel to the planes 38 and 39 and intersect at an angle that is comparable to 40. The planes 38 and 39 are the middle planes between the pair of angled bars and the flattened skin and sidewalls that are clamped between the bars.

The length of the bars used with each of the forms of FIGS. 8, 9 and 11 is a little greater than the combined maximum widths of the flattened portions of the three assembled main tubular members. Each of these portions has a maximum width that is approximately 1.57 times its diameter. In FIG. 11 the elongated tubular members 31 and 32 do not interfere with smooth folding and clamping of the main tubular members 14—14', 16—16' and 18—18', for each of them folds into a flattened portion which is well spaced from the planes 38 and 39 and from the flattened parts of the main tubular members, which are closely adjacent to these planes.

FIGS. 2 and 3 show two optional forms of a lower, stiffly-resilient, pad-supporting and pad-bracing structure. In FIG. 2 this comprises a streamlined skin 42, and a plurality of vertical tubes (of which only two are indicated at 43 in FIG. 2) that are constructed and arranged in the manner of FIG. 9 to conform to the streamlined skin. The vertical tubes contain gaseous material, for example air or lighter-than-air gas at a high pressure, and have flattened and sealed ends, with bonded-together flat-end portions of considerable extent. The upper set of these flat-end portions are fastened to the bottom of the cabin, and the lower set of the portions (two of which are shown at 44) are looped, fastened and bonded around the central part of the pad 22, with the inner one of these portions directly wrapped around the pad and each of these other bottom portions encompassing an inner portion.

In FIG. 3 this middle pad-supporting and pad-bracing structure is not vertical, but instead comprises a pair of diagonally-arranged bracing tubes or tubular-member elements of the above described type. The lower flat-end portions of these bracing tubular elements have integral or separate bands (long tabs) that are wrapped around the pad junctions 29 and bonded at 45. This form of the shock-absorbing device of FIG. 3 comprises a tandem pair of streamlined sets of fore-and-aft-arranged tubular members. The flattened-tube joints between the links of these tubular members may be made with clamps 37 or 34 as above described; or (as in the form of FIG. 2) instead of the clamps epoxy, vulcanizing material, brazing, welding, or other appropriate bonding material may be placed thru slits in the tubular walls, between the walls and between the tubular material and the skin.

Each of the main tandem tubular members of FIG. 3 optionally may comprise flat-joint-connected links or tubular elements 46, 47 and 48, in which event an auxiliary, separately formed, flat-joint-connected, diagonal, bracing comprises tubular elements 49 and 50; or the main tubular member may consist of the flat-joint-connected links 46, 49, 50 and 48; and then the auxiliary bracing means is a straight flat-ended tube 47.

In the shock-absorbing device of either FIG. 2 or FIG. 3 the wall material of each of the tubes or tubular members optionally may be and currently by preference is of resilient rubber or other resilient plastic and fabric in one or two plies — like rubber water hose (except that all but the trailing-edge tubular member are of larger diameters than such hose and it is preferably more flexible) — or like automobile tires, except that they are more flexible than tire casings and have ends. In this event the tubes will be recurrently inflated thru capped valves. But optionally instead the tubular wall material may be of flexible sheet metal (of copper, aluminum or resilient steel), in which event the valves or gas-inlet tubes are permanently sealed after the tubes are inflated.

THE VEHICULAR CABIN

Figure 6:
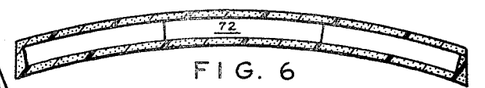

The useful-load-holding body has curved sidewalls that preferably are barrel-curved — that is have curved outer surfaces that arch inward toward the longitudinal axis from an area of greatest cabin bulge toward both ends of the cabin. This area of greatest cabin bulge may be substantially confined to a plane that is normal to the axis, and in this instance (as indicated in FIGS. 6 and 12) the cabin is entirely barrel-curved from one end to the other. Or, as indicated in FIGS. 1, 5 and 17, this area of greatest bulge may be a cylindrical middle part of the cabin, and from each end of the cylindrical part the outer surface is barrel curved to an end of the cabin.

The barrel-curved cabin optionally may be made of wooden staves, but preferably the stave-like, barrel-curved members used are of the general type shown in FIGS. 1, 2, 5, 6 and 12 to 20. Optionally, any of the forms of stave-like members shown in these figures may be used in the cabin of FIG. 1, FIG. 2, FIG. 3, or FIGS. 12 and 13. Preferably each of these forms comprises: sealed receptacles; gaseous materials in the receptacles; side pieces that incline inward toward each other; and foam plastic or concrete (having light-weight aggregate) between the side pieces.

In FIG. 1 the cabin is illustrated as having sidewalls that comprise tubular members 51, which preferably are in stave-like members. The cabin is here shown as having a cylindrical middle portion, with barrel-curved ends; but optionally it may be entirely barrel-curved from end to end. It has: barrel-hoop-like looped means that encompass the assembled and bonded-together stave-like members; foam plastic between the skin means and stave-like members; an after bulkhead 52, comprising a disk set inside ends of the stave-like members; a forward framed window 53; windowed members in the sidewalls (doors and/or windows) 54; and an outer skin means which comprises: a layer of wire mesh (which, preferably, may be resilient), tightly wrapped around the forward and middle portions of the stave-like members, and flattened into a fishtail stern 55 that curvingly tapers rearward to a flat, wide, bonded junction and to the line or flattened edge 56; and stiffly-flexible plastic impregnating and coating the mesh.

In FIGS. 2, 3, 12 and 13 the cabin also optionally may be barrel-curved only at its ends or from end to end. In FIG. 2 each of its stave-like members is indicated as comprising: wooden or metallic side pieces 57; inner pieces 58 (which may be planks, pieces of plywood, wooden staves, or metallic or reinforced-plastic elements that optionally may be barrel-curved; tubular members or hollow elements 59, of any of the forms disclosed in this specification; and foamed-plastic or light-weight-concrete filler material around the tubular members and between the side pieces. The contiguous faces of the stave-like members — of these side pieces — preferably are fixed together by bonding material (epoxy putty or other glue, or optionally welding or brazing when the side pieces are of metal). The median plane (58P) between each bonded pair of the side pieces, when the cabin is circular in cross section, radiates from a center line 58C that coincides with the longitudinal axis of the cabin. But when the cabin has the cross-sectional shape of FIG. 13, the median planes of the pairs of its bonded side pieces are as indicated in this figure and described below.

As shown in FIG. 2, the connections 60 between the resilient upright tubular elements and the cabin, as well as the connections 62 between these members and the balloon, preferably comprises epoxy putty or other glue, and optionally may include tubular filler members of the above-described type. As shown in FIG. 3, where the balloon means is much wider, such connections between the cabin and upright members preferably comprise, on each side of the cabin, a band of fabric or other strong, flexible material 64 and a streamlined, tube-comprising, middle element (66, fixed to the cabin) which may have a cross-sectional shape like that illustrated in FIG. 9.

As in FIGS. 1 to 3, the cabin of FIGS. 12 and 13 (usable in place of the cabin of FIG. 1, FIG. 2 or FIG. 3)

comprises: a plurality of side-by-side-assembled, stave-like members, each of which has a pair of side pieces 70, 148, 150; tubular means (or other hollow, gas-containing elements, for example air-filled or helium-filled spheres or balloons), 72, 73, 74, containing gaseous material; and (preferably) filler material (foam plastic or concrete, optionally reinforced with bamboo or the like — similar to elements 30 of FIG. 8) around or over the hollow elements and between the side pieces.

The hollow elements may be one or more sealed cans of the elongated type shown at 72 in FIG. 12 or in FIG. 6 or at the middle of FIG. 5; or they may comprise a plurality of shorter, end-joined cans or cylindrical or spherical, helium-filled balloons of plastic or very thin metal of the type shown in any of FIGS. 14 to 20. The shorter cans preferably are of one of the common types currently made and sold in large quantities, and in some of the invented structures they optionally may be used cans. The type shown in FIGS. 20 and 21 comprises a thin-metal cylinder and end caps permanently bonded to the cylinder. Other optionally used types are: cans of the kind currently used to hold paint, comprising a thin-metal cylinder, a factory-bonded end cap, and another cap that is a snap-on lid; cans of molded plastic; and cylindrical glass jars or other glass containers of gaseous material. Where, as in FIGS. 18 and 19, only one can 72' spans all or most of the distance between the two side pieces 70 the currently preferred type of tubular means is the common one-gallon form of metal can, having a snap-on lid which is preferably permanently soldered, brazed or glued in place, sealing the inside of the can.

In some structures the barrel-curving of the cabin (of its entire outer surface or of the surface of the cabin ends) has a radius of longitudinally sectional curvature that is sufficiently large to cause the narrowing of the distance between the pair of side pieces in each stave-like member from its midship parts to its end portions to be relatively small. In such cabins the cans or other hollow-elements of the member optionally may be of the same diameter from one of its ends to the other; and then there is more filler material flanking the cans at the middle of the member than near either of its ends. But when the radius of the longitudinal barrel curvature is such that the cabin's outer surface pitches sharply inward (toward the longitudinal axis and toward the bow or stern) the cans, tubes or the like preferably have larger diameters at the middle of the cabin than at its ends.

The sectional detail view in FIG. 14 is from a plane that longitudinally bisects one of stave-like members. The partial row here shown of end-joined cans, containing air or other gaseous material (or cylindrical or spherical balloons, preferably containing helium at above-atmospheric pressure) may be considered as part of a continuously arcuate stave-like member, such as are used in the continuously barrel-curved cabin form of FIG. 12; or as an end part of the cabin form generally indicated in FIGS. 5 and 17, which comprises a cylindrical middle portion 76 and forward and after barrel-curved portions 77. The cans 78 are preferably in contact at their innermost points (their lower points in FIG. 14); and the illustrated stave-like member is here shown as comprising light-weight-aggregate concrete, 79, as a filler material (between the two side pieces), formed into barrel-curved shape in a mold, but in connection with the cans or balloons 78 or any of the other hollow elements of FIGS. 12 to 21, the filler material of the stave-like member optionally may be: concrete, or concrete containing sections of bamboo 81 (in FIGS. 18 and 19); foam plastic (preferably of the closed-gas-cell type, preferably and optionally containing reinforcing sections of bamboo, 81; or metal (preferably aluminum or aluminum alloy), poured into a mold in molten-condition, between metal side pieces that are held at inclinations to each other by the sides of the mold. When the filler material is molten metal the hollow elements of course are not plastic balloons; and in any event, such thin balloons are not preferred. Metallic tubes or metallic or glass cans of usual thickness are superior in strength to very thin plastic or very-thin-metal balloons, even when they are of the preferred, very thin aluminum or copper and inflated at considerable pressure. Nevertheless, the arched nature of the balloon walls, together with the tendency of the substantially rigid foam plastic or concrete between the inclined side pieces, makes use of such balloons feasible, and at times desirable, in very light-weight but strong stave-like members.

When the side pieces of a stave-like member are of plywood, other lumber, or laminated cloth or metal fabric that has been impregnated with plastic or portland cement, filler material of any of the above-mentioned kinds strongly adheres to them at all times. When they are of sheet metal, foam plastic or cooled molten metal filler also will thus strongly adhere. And usually concrete also will adhere to the sheet-metal sides; but in this case their faces optionally may be roughened, for example by coarse-grinding.

Another way of making a stave-like member having metallic side pieces is: (1) cutting side pieces of expanded metal or other mesh (preferably of aluminum alloy) into the desired, curved-edge shape; (2) placing two such pieces in a mold, one against the slanting interior surface of each side of the mold; (3) placing the optional, hollow, filler-reinforcing elements between the pieces of mesh; (4) pouring the filler material in plastic condition between the side pieces; (5) allowing the filler to set; and (6) taking the completed stave-like member from the mold. In this form some of the filler material partly protrudes thru interstices of the mesh; and thus the stave-like member has rough outer side surfaces. This roughness aids in adherence of the bonding material between sides of the assembled stave-like members.

In an optional but not currently preferred form of the stave-like members the filler-reinforcing and cabin-insulating cans of any of the figures illustrating this invention may be replaced by a plurality of superposed sections or bent pieces of bamboo (such as 81) or other slender, elongated, hollow, gas-containing elements (such as lengths of straight or bent plastic tubes of small diameter).

The form of tubular means shown in FIG. 16 comprises sealed cans 80 (containing gaseous material) that are designed for a barrel-curved stave-like member (which may be entirely barrel-curved or partially barrel-curved as indicated in FIGS. 5 and 17). Each of the cans 80 comprises a cylindrical part and a pair of end caps that slant inwardly toward each other, and toward the center line of curvature of the barrel-curved member or portion. These cans, optionally bonded together at their ends by welding, brazing, epoxy glue, or the like, are placed in a mold and the filler material (optionally of foam plastic, concrete, or metal as shown in FIG. 16) is formed around them, into the desired barrel-curved shape of the entire barrel-curved member or of its barrel-curved end portions.

The straight middle portion 76 of the form of stave-like member shown in FIG. 17 may comprise a single sealed tube, of the general type indicated at 72 in FIG. 12, but bent only in its end portions; or it may be made as shown in FIG. 15 or FIG. 20. In FIG. 15 cans 72, optionally of the same diameter, are illustrated as fixed together in a row by the bonding material 84. This bonding material, optionally used with the cans 72 or any of the other end-joined cans of this invention, may be epoxy putty or other glue, brazing, soldering or welding. In FIG. 17 two sealed cans, 86 and 88 (containing gaseous material), are shown as end-joined at the joint 90. This joint may be of the type of FIG. 15; or, alternatively, the two cans 86 and 88 may be replaced by a row of end-joined cans of the type shown in FIG. 20. Here each end cap of a smaller can fits into the recess of an end cap of a larger can; and the two are preferably fixed together, before forming the filler material around them, by the bonding material 92. Foam plastic 94 is shown in FIG. 20 as the filler material but when concrete (shown in FIGS. 14, 15, 19 and 21) or metal (as shown in FIG. 16) is utilized the bonding material 92 is preferably eliminated and during molding the end-joined cans may be held in tight contact by a can-end-engaging bolt at each end of the mold.

The outer and inner edges of the side pieces of the stave-like member are optionally shaped as indicated in FIG. 12 or FIG. 17. They may comprise a shaped plank or piece of plywood or fabric-reinforced plastic; if of thick plywood, or a plank, or plastic, the outer skin means 96 (in FIG. 14) and the inner skin means 98 (in FIGS. 12 and 14) may be fixed to each side piece by glue combined with screws, nails, long tacks or the like. But when the pieces are or metal (preferably aluminum or aluminum alloy) the skins are fixed to them by bonding material (glue, brazing, soldering or welding), optionally with the aid of screws in metal angles fixed to edge portions of the pieces and imbedded in the filler material.

The skin means utilized optionally may be: a thick coating of waterproof paint or air-set liquid-rubber cement on the inner and outer surfaces of the assembled stave-like members (for example, 98 and 100 in FIG. 12); rubber sheeting 102 (in FIG. 13), optionally in gores, tautly stretched over and bonded to the outer and/or inner surfaces of the stave-like members; glued, closely woven fabric; or pain-coated stucco of the type shown at 96 or 98 in FIG. 14 or in FIGS. 18, 19 and 21. As indicated in FIG. 14, the inner stucco 98 (and optionally the exterior stucco) comprises a layer of fabric, 104 (of metal mesh or coarsely woven cloth, but preferably of apertured, expanded metal, for example of aluminum alloy), and stucco material that is plastic when applied but then sets into a firm, shape-preserving substance. This material may comprise epoxy putty or portland cement and fine, light-weight aggregate, such as pumice, small plastic globules or the like (96 in FIGS. 14, 19 and 21); or the cement utilized with this fine aggregate may be epoxy resin (such synthetic-plastic stucco is shown at 98 in FIG. 18); and the inner skin means indicated at 108 in FIG. 18 optionally may be either stucco of this type or gores of rubber sheeting glued to the stave-like members and to each other at their adjacent edges.

In each form of the cabin or other container, shown in FIGS. 1, 2, 12 and 13 the stave-like members are preferably held in clamped relation to each other by a looped means, shown in FIGS. 12 and 14 as strong, metallic, barrel-hoop-like rings or bands, 110, preferably of aluminum alloy or thin steel. Instead of these bands 110, this looped means that tautly holds the elongated members together (with the aid of glue between their juxtaposed faces) may be glued wire mesh (optionally in gores that are fastened together at their contacting edges, or in spirally wound strips). Preferably the bands 110 are endless; but optionally they may be in the form of a split ring — that is, a band having ends (for example of apertured pipe strap); and the ends of this band are clamped toward each other and welded, riveted or bolted together. Screws or the like, in addition to the glue used, may fasten these bands (or the wire mesh, or the rings 110 when as is preferable they are apertured) to inner and outer edges of the side pieces 57, 70, 148, 150.

The gaseous material in each of the disclosed forms of hollow or tubular means may be air, helium or other gas, optionally under above-atmospheric pressure, or gas-cell-containing foam plastic as indicated at 112, in FIG. 15. Curved metallic tubes of the general type indicated in FIGS. 6 and 12 may be filled with pressurized gas (for example with air under above-atmospheric pressure of fifteen pounds or more); the gas inlet opening is then permanently sealed with bonding material; and then the gas-filled tube is bent with the aid of dies into the desired curvature. A single elongated tube optionally replacing the cans 86, 88 and 114 of FIG. 17 also may be bent at its ends in this manner. The middle portion 76 of the sealed, gas-filled tube is held straight by the die, while the two curved end portions 77 are bent out of straight condition. Instead of the above-mentioned pressurized gas, gas-cell containing foam plastic inside the tubular members that are to be bent may be placed under above-atmospheric pressure in a known manner; and the optional foam plastic 112 in any of the other tubular members or cans may similarly be pressurized.

Stave-like members of any of the above forms may be assembled into a vehicular cabin or other container that is circular in cross sections, as indicated in FIGS. 18 and 19, with the center line of the radii of exterior curvature being shown at 116. This line is straight, and in this form of the invention it is the longitudinal axis of the cabin or other container. Any of the cabins of FIGS. 1 to 3 and 12 optionally may be made in this circular-in-cross-section form, in which the like members are all alike and comprise side pieces, each adjoining pair of which are bonded together in a planar joint, the middle plane of which coincides with a radial plane 58P (in FIG. 2, 118 in FIGS. 18 and 19).

Another optional type of the cabin which may be made of the assembled stave-like members is shown in FIG. 13. In each cross section normal to the longitudinal axis of this form the exterior curvature comprises arcs of different radii, and all of these arcs do not have the same center line of curvature. For example, the center line of the cross-sectional arc of curvature of the stave-like members on the left-hand side of FIG. 14 (excepting those of the cabin's rounded corners) is indicated at 119. This straight line is also the center of curvature of the radial planes 120 of the left-hand part of the figure, each of which is the median, boundary plane between two adjoined side pieces 70. And the center line of curvature of the lower stave-like members (of the arcs of the cabin skin means), and of the radial planes 122 which are between lower side pieces 70, is shown at 124 (in FIG. 12).

The shape of the stave-like members at the four rounded cabin corners is determined in accordance with the diagram of FIG. 13A. The two arcs 126 and 128 are comparable to cross-sectional-plane arcs of the outer and inner curvatures of the upper set of the assembled stave-like members; and the arcs 130 and 132 are comparable to cross-sectional-plane arcs of the outer curvature 134 and the inner curvature 136 of the right-hand set of stave-like members of FIG. 13. The arcs 126 and 130 intersect at the point 138; and 128 and 132 intersect at point 140. On the straight line 141 between points 138 and 140 is located the center line of curvature of the arcs 142 and 144 of the stave-like member (or members) at the rounded upper right-hand cabin corner. The specific position of this straight center line depends on the arcuate curve necessary to provide a smooth fairing at the corner.

As shown in the lower, left-hand part of FIG. 13, this smooth fairing optionally may comprise two stave-like members having adjoined side pieces that meet and are bonded together along the plane 146 — along the median plane between the side piece 148 (that is parallel to a plane 120) and the side piece 150 (parallel to a plane 122). Alternatively, the rounded-corner fairings may comprise only one stave-like member, having a span over the entire distance between side pieces 148 and 150, as indicated at the lower right-hand-corner fairing of FIG. 2. In any event, the gas-containing tubes, cans or the like in the corner fairings may be any of the above-described types, and may comprise a single bent tube 72 or any suitable plurality of the disclosed hollow elements.

FIGS. 18 and 19 indicate the manner in which the distance between the pair of side pieces 70 of each of the barrel-curved, stave-like members decreases from a cross-sectional plane of greatest cabin perimeter toward the bow (or the stern). In a cabin that has an exterior barrel-curved surface extending in continuous barrel curvature from the bow to the stern there is only one such plane, normal to the cabin's axis; this may be substantially midway between the forward and rear ends, as illustrated in FIGS. 6 and 12, or (as is preferable in streamlining the cabin of a vehicle) this plane of the greatest barrel-like bulge may be considerably nearer to the bow than to the stern. But in a barrel-curved cabin which, as indicated in FIGS. 1, 5 and 17, has a straight midship section and barrel-curving only at its ends there are two cross-sectional planes of the greatest perimeter from which the barrel-curving decreases toward ends of the structure — one toward the bow, and the other toward the stern. The cross-sectional plane of FIG. 18 may be considered either as one of these two last-named planes or as the single plane of greatest perimeter of a continuously barrel-curved cabin. In any event, from this plane of greatest perimeter the barrel-curved surface of each stave-like member slopes toward an end of the cabin and toward a smaller cross-sectional perimeter. In FIGS. 18 and 19 a plane of greatest cabin perimeter is indicated at 152; and from this plane toward an end of the cabin the barrel curvature of the cross-sectional cabin perimeters — as well as that of each of the stave-like members — slopes, for example to the perimeter 154 at a plane comparable to 19—19 of FIG. 17 — and on beyond this plane to the last-named end of the cabin. As indicated in FIGS. 18 and 19, the outer edges of the side pieces 70 similarly are curved inward from a plane of greatest cabin bulge; and this curving progressively causes their forward and after portions to be spaced closer together than their distance apart at points nearer to the middle of the cabin or other container. The hollow, gas-containing elements between each pair of the side pieces thus are sufficiently small in diameter (or in bulk of bamboo pieces) to fit in the narrower portions of the stave-like members.

The insulated cabin is illustrated in FIGS. 12 and 13 as having windowed openings. These may be doors, upper hatches (optionally solid), or fixed windows. The windowed openings that are illustrated as examples are: a door at 156, on the viewer's side of FIG. 12, having a windowed portion 157 and a solid portion 158; a similar door at 159, on the far side of the cabin; a pair of windows (or doors), on opposite sides of the vehicle at 160 and 161; a forward window at 162 (plexiglass or glass), having two panes, 163 and 164; and a rearward window with two panes 165 and 166 (which in a land vehicle — including an aircraft that lands on a solid surface — may be hinged and used as a small door).

Each of the side windowed openings (for example, 156 or 160) is preferably strongly held in place by bolts of the type shown in FIG. 21 at 167. These bolts preferably are utilized whether they are fixed to an end of a continuously curved stave-like member or to one that has a straight part at the shuttered opening. Each bolt is inserted thru an opening in the end tubular member (for example 167A in FIG. 21), is placed in a hole in the end cap 167B and clamped there by a nut and epoxy putty or other bonding material. In assembling each of the shorter stave-like members to a shuttered opening its frame 97C is appropriately drilled, the bolt is inserted in the frame hole and clamped thereby the nut 167D, which fits in a countersunk recess in the frame.

Each of the end windows has a bracing frame that adds considerable strength to the cabin and vehicle. The main structure of this frame is preferably an endless band 168, and preferably of metal (for example aluminum alloy or steel). At each window a slender, bracing bar, 169, optionally may be provided; but preferably and as illustrated this bracing element is only in the larger, front window. These cabin-bracing frames not only provide extra cabin strength and protection for its occupants by the arched strength of their outer perimeters and the optional bracing bars, and by each of the inner panes 164 and 166 when an outer pane 163 or 165 is broken, but they also are of considerable utility in the assembly of the cabin or other container.

ASSEMBLY OF THE CABIN

The first step in assembling the structure is the placing of the bands 168 in proper position on a fixture or fixtures. This fixture comprises a pair of curved, upright, member-positioning bars on each side of the cabin, having curved inner surfaces (facing toward each other and toward the cabin being built) whose curvatures conform to those of the cabin at planes spaced from each other in fore-and-aft direction. These bars, fairly close together and near the middle of the cabin, are hinged to the factory floor, and have diagonally-bracing reinforcing bars that are also hinged at their bases to the floor. So that before each positioning of a stave-like member in the assembly the reinforcing bars are hinged sidewise out of the way of movement of the member-positioning bars, and these latter bars are then pivoted away from the cabin enough to permit insertion of the stave-like member.

After the first step, the method of assembly comprises the following other steps: (2) Placing the bottommost or keel-area stave-like member 170 below the bracing bands 168 (the side pieces preferably have been notched, as at 172, to facilitate assembly of the bands and stave-like members). (3) Applying epoxy putty or other glue to the outer faces of the bottom stave-like member, and also coating with such glue two other members on their faces that are to join those of the bottom member. (4) Placing the glued faces of these two other members on the fixture and in contact with the bottom member, one on each side of it. (5) Similarly gluing and placing the next two of the members, one on each side of a central plane that contains the longitudinal axis of the cabin. (6) Continuing to thus glue and position successive stave-like members until they are all in place, with the topmost one (comparable to the middle stave-like member of FIGS. 18 and 19) fitting snugly and wedgingly between adjacent members. (7) Optionally before the glue has entirely set, the bands 110 or one of the other optional forms of the looped, member-supporting means) are glued and strongly placed in clamping, encompassing relation to the stave-like members. When the bands are endless, barrel-like hoops they preferably are forced up a forward or after part of the barrel curvature (as barrel hoops are forced), and then are welded, screw-fastened or nailed to the outer edges of the side pieces of the stave-like members. After the first endless ring 110 (or equivalent pipe strap having ends or the first turn of a spirally wound mesh) is in place and fastened, the curved, member-positioning, jig bars and their braces are pivoted out of the way; and then the remainder of the looped means is fastened around the basic, insulating cabin frame. The part of the looped means at each container end may be in a position similar to that indicated at 174; or where the ends of the side pieces are exteriorly notched a hoop or bent piece of pipe strap 176 is fitted tightly in place in the exterior notch. Then, as shown in FIG. 12, epoxy putty or other bonding material, 178, is applied over the band and against the edges of the notch. (8) A selected one of the above-described skin means is applied around and bonded to the outer surfaces of the stave-like members and the looped means.

In the above method of making a vehicular cabin the frames of the doors (or hatches) and windows are positioned between shorter stave-like members, as above described. These doors and other windowed elements may be installed in their frames in previous sub-assembly; or they may be positioned in a final-assembly step. Also a flat deck (indicated in FIG. 1 at 180), of wood framing and floors, or reinforced plastic, or light-weight concrete, or the like, preferably is provided in each of the disclosed cabins.

THE BALLOON MEANS

A balloon or group of balloons inflated with helium or other lighter-than-air gas, is preferably at the top of the vehicle, to provide a weight-lessening lift on it and a stabilizing force tending to prevent its pitching and rolling. In each of FIGS. 1 to 3 the balloon means 2 may have a single envelope; or, optionally and preferably, it may have an outer envelope that incloses snugly fitting balloon bags — for example, two or more end-to-end-arranged bags that have axes that are in a vertical plane which contains the longitudinal axis of the cabin, or a plurality of bags on each side of this vertical plane. In any event, all areas of the outer envelope are preferably mildly distended by the slightly-above-atmospheric inflation of the lighter-than-air gas contained within it, and the envelope (made of strong, flexible plastic, of nylon or other balloon cloth, or very thin aluminum is tapered and streamlined toward its after end, where it merges at 181 with the outer skin 182 of the doughnut-shaped support for the steering propeller. The forward and rearmost balloon bags within the envelope are tapered to conform to the balloon shapes of FIG. 1 or FIG. 2.

As illustrated in FIGS. 2 and 3, the outer balloon envelope, also preferably inclosing a plurality of inflated, snugly fitting balloon bags, has a curvingly tapered end, 184, flattened and bonded at its adjoining end edges 185. In this form of FIGS. 2 and 3 the end curvature at both the bow and stern of the vehicle preferably conforms to cabin-end curvature of equal radii at both ends — of the general type of FIG. 6 or FIG. 12 — or, as in FIG. 1 or FIG. 5, where the cabin has a cylindrical middle part, but its forward-end curvature, as illustrated in FIG. 1 or FIG. 5, is modified from its illustration in either of these figures to have radii that are equal to those of the after end curvature.

Where the ratio of the balloon length to its diameter is sufficiently large to permit it to have a circular cross section with no wrinkling of its tapered portions the flat, bonded edges 185 are approximately 1.57 times the diameter and the length of the curving taper is roughly, empirically in the neighborhood of two and three-fourths times the diameter. These ratios are constant; they may be exactly and mathematically calculated, as constantly depending on the actual or potential diameter. For instance, a balloon that is about 34 feet long and 8 feet in diameter (smaller than the preferred size) curvingly tapers from a circular-in-cross-section area outward to a width (height) at the flat edge 185 of approximately 12.56 feet, and the length of its curving taper at each end of the balloon is about 22 feet. Such a balloon contains about 1600 cubic feet of helium or other lighter-than-air gas, which has sufficient lifting force, acting on a lever arm extending from the center of lift to the center of gravity of the vehicle, to substantially aid in preventing rolling and pitching of the craft. When an inflated, eight-foot-diameter balloon of this invention is shorter than 33 feet it has no circular dimension; its greatest cross-sectional perimeter then is in the form of an ellipse with its major dimension in an upright position; but its curvingly tapered portions generally have the same longitudinal curvature as in the eight-foot-diameter, 34-foot balloon. This curvature, depending on the balloon's diameter, determines the longitudinal curvature of the cabin's optionally conforming barrel-curved ends. Preferably, the diameter of the balloon is two or more times that of the cabin. For example, a balloon that is 14 feet in diameter and 50 feet in length has a large and effective stabilizing force. In fact, such a balloon would lift a quite light vehicle out of the water or off the land; and of course if the balloon means is sufficiently large it will lift a heavy vehicle into the air. In this event the preferred ratio between aerostatic lift and weight is such as to cause the vehicle to rise only a short distance in the air — preferably less than a hundred feet above the landing surface.

The balloon means is securely fastened to the cabin; and as pointed out above, this cabin preferably is connected to power steering means of the type of 194–200 of FIG. 1. This enables the balloon-bulky craft to maintain a desired course. Preferably and as indicated in FIG. 2, the fastening means comprises a net over the balloon fixed at its bottom to the cabin by epoxy glue and by fastening devices which include cords 186 that pass thru and are tied to eyelets 187 at the upper ends of the two upright parts of the pad supporting means.

VEHICLE-STEERING MEANS

Optionally, some forms of the invented craft may be steered by a conventional, aerodynamic rudder (with or without a conventional elevator) hinged to the stern of the cabin or a water-traversing rudder of the type shown at 188 (turned by a bar or rod, sealingly mounted in the bearings 190. But preferably the steering means, in each of the three disclosed forms of the craft, is of the type shown at 4.

This means comprises: the above-mentioned outer skin 182 of the doughnut-shaped main support for the aeronautical steering propeller; gaseous material within this skin which may consist entirely of stiffly resilient or substantially rigid, gas-cell-containing foam plastic (192, preferably under above-atmospheric pressure) or, preferably, comprise such plastic and, imbedded in it, one or more doughnut-shaped tubes 193 (FIG. 7), of thin aluminum, thin copper or steel, or fabric and plastic (similar to an automobile tire and strongly inflated with air or lighter-than-air gas, for example at pressures of 15 to 30 pounds per square inch); streamlined element 194 which optionally may be gearing, driven by a shaft from the forward main engine or motor 196, but preferably is a fluid or electric motor, receiving hydraulic fluid or electric current via line 197, connected to a source of fluid or electric power, driven by a main engine and controlled by a valve or switch inside the cabin; and the streamlined, propeller-supporting struts 198 and 199, strongly fixed to the doughnut-shaped support and to the streamlined housing of 194 (each of these struts may be a single, shaped, hollow tube, or optionally may comprise several small-diameter, sealed, cylindrical tubes, inflated with gas at a pressure well above that of the atmosphere, covered with foamed or other plastic that is within a streamlined skin); and the steering propeller 200, exerting an aerodynamic force on the cabin for steering.

The direction of this aerodynamic force, and the consequent direction in which the vehicle is steered, are controlled from inside the cabin in one of two optional ways: (1) The propeller 200 may comprise thin blades and a known form of pitch-changing and pitch-reversing mechanism (for instance, comprising a servomotor, controlled by an electric switch or fluid valve that is manually actuated to determine the direction of the aerodynamic force and the amount of the said force — ranging from zero at zero pitch upward). Or (2) the propeller 200 may be turned by a reversible electric or fluid motor 194 — reversible and speed-controlled by manual control means in the cabin.

The skin means 182 comprises fabric (preferably expanded-metal aluminum alloy or steel mesh) and dense plastic or portland-cement stucco, impregnating and coating the mesh. And the doughnut-tube-bracing element 202, comprising a strong skin of metal or of the above-described type of stuccoed mesh, provides a vehicle-strengthening streamlined fairing for the after end of the steering-propeller support.

This support is further braced and strengthened by: (1) the framed contiguous edges of the hole in the cabin's top (originally formed between shorter ones of the stave-like members or, optionally, cut out after these members are assembled) and epoxy putty or other adhesive which strongly bonds the curved surface of the skin 182 to these edges; (2) the lower contact between the bottom surface of the support and the skin of the fishtailed stern 55, together with epoxy putty, other glue, or welding or the like, 204, between these contacting portions; and (3) the gas-cell-containing foam plastic 206 which is preferably injected under pressure as foaming liquids thru a small, quickly sealable hole in the after part of the skin of 55 and aft of the bulkhead 52. Preferably all the foam plastic of this invention is of this closed-gas-cell type and is thus put in place under gaseous pressure.

Preferably, the above-described type of steering-propeller assembly is also incorporated in the forms of the invention shown in FIGS. 2 and 3. In this event the flat rear end 185 of the balloon envelope is spaced farther from the stern window 208 than it is illustrated in FIGS. 2 and 3 — spaced sufficiently forward for anchoring the propeller assembly 4 in the after end of the cabin.

Because of the preferred considerable distance between the bottom of the cushioning or float means and the top of the balloon — for example between twenty and thirty feet and the optional but preferred hydrofoil type of the cushioning means, which climbs in water during water-traversing travel, the steering-propeller assembly 4 is of great advantage in this invention, for it enables powerful and positive control of the direction of the craft in strong winds.

Although jet propulsion may be utilized in the three disclosed forms of the invented craft, a mechanical propeller is currently preferred. The forward propeller 210 is driven by the motor 196, which optionally may be an internal combustion engine, or a fluid or electric motor.

Within the scope of the following claims, various changes in the specific disclosed structure may be made. For example: two bars, each mostly parallel to the longitudinal axis of the cabin, may be fastened below and to the pad or pair of pads, to serve as keels, skis or means supporting axles and wheels; the type of cushioning and propelling means shown in FIG. 2 or FIG. 3 may be substituted for the pad 3–12 and the propeller 210 of FIG. 1; the bottom surface of the pad 3 of FIG. 1 may be inclined to the horizontal to provide extra lifting force during travel; and the gaseous means within the tubular or hollow elements optionally may be either the above-described pressurized gas or gas-cell-containing foam plastic that preferably is under above-atmospheric pressure, within its flexible skin.

In the following claims, unless otherwise qualified: the term "barrel-curved" refers to a surface, and means: curved in cross section and also curved longitudinally and inwardly of the surface, with decreasing radii of curvature from each cross-sectional plane thru the barrel-curved surface toward its end; the word "plastic" signifies rubber or any other type of natural or synthetic plastic; the term "gaseous material" signifies: any gas, gaseous mixture, gas-cell-containing foam plastic, or yieldable material comprising fibers or other particles and air or other gas between the particles; "tubular member:" a single elongated tube or a plurality of end-connected tubular elements, of any cross-sectional shape; "tubular element:" a single tube or section of a tubular member; "can" means: a tubular element of any material and cross-sectional shape, having end elements "upright:" erect or inclined to a horizontal plane; "fluidfoil:" an airfoil or hydrofoil; and "boat" signifies a water-traversing boat or an aircraft capable of water-surface travel.

I claim:

1. Vehicular structure, comprising:
a load-supporting body, having a longitudinal axis; and shock-absorbing means connected to said body, comprising: at least one set of a plurality of main, elongated, tubular members in side-by-side arrangement within an enveloping skin,
in which each of said elongated members comprises a single tube with flattened ends and intermediate flattened angular parts, each said tube comprises tubular elements, end-joined by said flattened parts, and each said set comprises: on each side of said longitudinal axis, an upright, tubular-element pad support, having tube-and-skin-flattened upper and lower pad-support ends; spaced below said body, a substantially horizontal, tubular-element pad, having tube-and-skin-flattened ends that are joined to the lower pair of said pad-support ends; and means holding the said tube-and-skin-flattened ends in substantially flat condition;
connecting means between the load-supporting body and each upper end of the upright pad supports;
gaseous material under above-atmospheric pressure in each of said tubular elements; and
skin means, comprising a pad skin that encompasses the tubular elements of said pad and a pad-support skin that encompasses the tubular elements of each upright pad support.

2. Vehicular structure as set forth in claim 1, comprising foam plastic between each of said skins and plurality of skin-enveloped tubular members.

3. A device as set forth in claim 1, in which the said structure is a boat, and the said pad is a hydrofoil, exerting a lifting force on the load-supporting body when the boat is traversing water.

4. Structure as set forth in claim 1, in which the said structure is a boat, and the said pad is a float.

5. A boat as set forth in claim 4, comprising foam plastic between the said tubular elements and skin, in which the said float is a hydrofoil, having fluidfoil surfaces that exert a lift on said body when the boat is traversing water.

6. Structure as set forth in claim 1, in which said pad skin is of flexible material, and contains resilient foam plastic, between the skin and tubular elements.

7. Structure as set forth in claim 1, in which: each of the said upright, pad-support tubular elements extends upward to a side of the said body; and said connecting means between the load-supporting body and upper ends of the upright tubular elements comprises a pair of braces, one jutting laterally outward from each side of the body, and means fastening the ends of said braces to the body and to said upright elements.

8. Structure as set forth in claim 1, comprising a sealed filler tube, containing gaseous material, between juxtaposed tubular elements.

9. Structure as set forth in claim 1, further comprising: balloon means above said load-supporting body; and connections between said balloon means and said body, comprising: upward extensions of said pad supports; and means connecting said extensions to said balloon means.

10. Vehicular structure comprising three major members consisting of: a pad; and two pad-supporting members, adapted to be fastened to a load-supporting body, one being connected to each end of said pad; the said structure comprising:
in each of said three major members, a set of juxtaposed tubular elements, each of which contains gaseous material under above-atmospheric pressure, has flattened-tube ends, and is connected, endwise and integrally, to two other tubular elements of the same maximum diameter in two others of the said major members; said elements being portions of a tube with substantially flattened parts; skin means, comprising a skin encompassing each of said sets of tubular elements; and
a substantially-flattened-tube joint between each adjacent pair of said major members, comprising: flattened folds of said skin means and tube portions, forming a joined pair of said substantially flattened-tube ends; and means holding said folds in flattened condition.

11. A vehicle, comprising:
a cabin, having exteriorly curved surfaces, at least a part of which are barrel-curved, including: a plurality of elongated, stave-like, cabin-strength-providing members, assembled in side-by-side arrangement in a wall that encompasses a load-containing space, each of these members comprising: side surfaces that are inclined toward each other, inwardly and toward the said space; a curved outer surface that is barrel-curved at least in end portions; and a plurality of cabin-strength-providing cans, each of which is located between and connected to a pair of said side surfaces; and strong looped means, encompassing and holding together said stave-like members;
balloon means, exterior of said cabin and connected to it, having: a center of buoyancy above the center of gravity of the cabin; a volume at least as large as that of the cabin; an outer skin that along its top portion is unapertured and continuous from its forward, bow-portion end to its after end portion;
power-steering means, comprising: steering-propulsion means, exerting steering force on said cabin; means for supplying power to said steering-propulsion means; means for controlling the direction of the said steering force; and means connecting the said steering propulsion means to an end portion of the cabin, transmitting the said force to the cabin;
shock-absorbing means, below said cabin; and
connecting means between said cabin and shock-absorbing means.

12. A vehicle as set forth in claim 11, in which: each adjacent pair of said cans, in each of said stave-like members, have end-cap elements that are adjacent to each other; and said vehicle further comprises means in each of said stave-like members between and linking said cans together.

13. A vehicle as set forth in claim 12, in which said can-linking means comprises molded material of the type that is fluent when applied and sets with the passage of time into firm material.

14. A vehicle as set forth in claim 13, in which said molded material comprises plastic; and said side surfaces are surfaces of said plastic.

15. A vehicle as set forth in claim 13, in which: each of said stave-like members comprises a pair of cabin-strength-providing side pieces; said side surfaces are faces of said side pieces; said molded material is contiguous to said faces and between said faces and cans.

16. A vehicle as set forth in claim 11, in which said cabin has an opening in one of its walls, and said steering-propulsion means comprises: structure for supporting said steering-propulsion means, extending thru and contiguous to edges of said opening; and means for bracingly connecting said structure to said edges.

17. A device as set forth in claim 11, in which the vehicle is a boat, and the said shock-absorbing means comprises a pad, constructed and arranged to exert a lifting force on the boat.

18. A boat as set forth in claim 17, in which the said pad is substantially lighter-than water, and the said lifting force is buoyancy.

19. A vehicle as set forth in claim 11, in which: the said shock absorbing means comprises a flexible pad, sufficiently spaced below the cabin for fluid thru which it travels to pass over upper and lower surfaces of a substantial portion of the pad; and the said flexible connecting means comprises a resilient, bracing member, spanning space between and connected to the pad and cabin.

20. A vehicle as set forth in claim 19, in which the said pad comprises: a plurality of side-by-side tubular elements, having vehicularly transverse axes and flexible sidewalls, with a tubular element of relatively larger cross-sectional diameter located forward of a tubular element having a cross-sectional diameter that is smaller than said larger diameter; gaseous material under pressure greater than that of the atmosphere in each of said tubular elements; and a skin, encompassing said tubular elements.

21. A vehicle as set forth in claim 11, in which: said shock-absorbing means is resilient and comprises at least one resilient pad; and the said pad comprises: a pad skin; a plurality of tubular members within said pad skin; and gaseous material within said tubular members.

22. A vehicle as set forth in claim 21, in which said pad comprises foam plastic between said tubular members and pad skin.

23. A vehicle as set forth in claim 21, in which: said pad is a fluidfoil; and the bottom surface of said fluidfoil exerts fluid-dynamic lifting force on said cabin.

24. A vehicle, comprising:
a vehicle-strength-providing, load-supporting body, having: a substantially rigid frame with a fore-and-aft, slot-like opening in its upper part;
power-steering means for exerting a thrust transversely of the fore-and-aft axis of the vehicle, comprising: propelling means; structure for supporting said propelling means, having an upper portion exposed to ambient air above said slot-like opening and a lower portion within said opening; and means for bracingly and fixedly connecting said structure to said edges;
balloon means, above said body and connected to it, having: a volume at least as large as that of said body; an outer skin that along its top portion is unapertured and continuous from its forward, bow-portion end to an after-end part that is connected to the said upper portion of said structure;
the said after-end balloon part and said supporting structure being constructed and arranged to provide substantially smooth flow of ambient air, during travel of the vehicle, over the balloon skin to and over outside surfaces of the upper portion of said structure.

25. A vehicle as set forth in claim 24, in which said balloon skin has a flat, straight forward-end edge, extending substantially vertically and well above the said body.

26. A vehicle, comprising:
a vehicle-strength-providing, load-supporting body, having: a substantially rigid frame; and a barrel-curved forward-end portion;
power-steering means, comprising: propelling means for exerting a thrust transversely of the fore-and-aft axis of the vehicle; structure for supporting said propelling means, having a portion forward and above an upper part of said frame; and means for bracingly connecting said propelling means to said body;
balloon means, exterior of said body, and connected to it, having a center of buoyancy above the center of gravity of said body, and an outer skin that along its top portion is unapertured and continuous from its forward, bow portion to its after-end part; the said bow portion having: a straight, substantially sharp forward-end edge, extending substantially vertically and well above said body; and a skin surface that is curved to conform to curvature of said barrel-curved forward-end portion;
the said after-end balloon part and said supporting structure being constructed and arranged to provide substantially smooth flow of ambient air, during travel of the vehicle, over the said balloon skin and to and over outside surfaces of the said portion above the frame.

27. A vehicle as set forth in claim 26, in which the said means for bracingly connecting said propelling means to the body holds the propelling means in fixed relation to said body.

28. A vehicle as set forth in claim 26, in which: said body has a fish-tailed after-end part that curvingly tapers rearward from a portion of greater bulge of the body to a substantially straight and horizontal rear edge, said fish-tailed part having a slot-like hole in its upper portion; the said structure for supporting the propelling means has a lower part extending thru said hole; and the said means connecting the propelling means to the body comprises means for fastening said lower part to the edges of said hole.

* * * * *